United States Patent

Porsche et al.

[15] 3,659,901
[45] May 2, 1972

[54] WHEEL FOR AUTOMOTIVE VEHICLES

[72] Inventors: Ferdinand Anton Ernst Porsche, Stuttgart-Nord; Ferdinand Alexander Porsche, Doffingen, both of Germany

[73] Assignee: Firma Dr.-Ing. h.c.F. Porsche KG, Stuttgart-Zuffenhausen, Germany

[22] Filed: Sept. 9, 1969

[21] Appl. No.: 856,381

[30]     Foreign Application Priority Data

Oct. 10, 1968    Germany......................P 18 02 298.5

[52] U.S. Cl.............................................................301/65
[51] Int. Cl...........................................................B60b 3/06
[58] Field of Search........................301/65, 64 R, 64 SD, 104

[56]                References Cited

FOREIGN PATENTS OR APPLICATIONS 3,077      1913    Great Britain..........................301/104
287,600    7/1931   Italy..........................................301/65
579,294    7/1958   Italy..........................................301/65

*Primary Examiner*—Richard J. Johnson
*Attorney*—Craig, Antonelli & Hill

[57]                ABSTRACT

A wheel for automotive vehicles has a flanged hub and a rim connected by at least eight webs which are exclusively Y-shaped in cross-section. The vertical or upright flanges of the webs extend at the front face of the wheel and terminate at an annular disk provided on the front face of the flange, and the bifurcated sections are joined to the outer circumference of an annular body provided on the inner side of the annular disk. The Y-shaped webs extend in planes disposed between the bores, and the bifurcated sections of the Y-shaped webs diverge in the zone of the annular disk in a V-like manner toward each adjacent bore provided in the flanged hub. Additionally, the wheel is cast integrally from a light alloy.

5 Claims, 4 Drawing Figures

Patented May 2, 1972

Inventors
Ferdinand Anton Ernst Porsche
Ferdinand Alexander Porsche
By Craig, Antonelli, Stewart & Hill
ATTORNEYS Inventors
Ferdinand Anton Ernst Porsche
Ferdinand Alexander Porsche
By Craig, Antonelli, Stewart & Hill
ATTORNEYS

WHEEL FOR AUTOMOTIVE VEHICLES

BACKGROUND OF THE INVENTION

The present invention relates to a wheel for automotive vehicles, and more particularly, to a wheel which is cast integrally from a light alloy and which has a flanged hub and a rim.

In automotive vehicle wheels, it is necessary to keep the moment of inertia as small as possible. This can be accomplished by a low-weight wheel construction. At the same time, however, the wheel must have sufficient strength to withstand all stresses exerted thereupon.

Wheels of the aforementioned type of construction are known, wherein the rim is connected with the flanged hub by planar surfaces having a large area and relief apertures provided in these surfaces. However, the disadvantage of this type of construction is that, due to the configuration and arrangement of the planar surfaces, it is impossible to obtain both a satisfactory and lightweight wheel construction having sufficient strength. Furthermore, these wheels have another disadvantage in that the bores serving to mount the wheel are disposed asymmetrically with respect to the planar surfaces and the ribs connecting the flanged hub and the rim as shown in U.S. Design Pat. No. 208,542.

SUMMARY OF THE INVENTION

It is the aim of the present invention to provide a wheel of the aforementioned type which is characterized by high strength and low weight. In this connection, the webs or ribs and the mounting bores are also to be arranged in the correct mutual relationship from a functional point of view.

The underlying problems are solved in accordance with the present invention by providing at least eight webs which are exclusively Y-shaped in cross-section for connecting the rim with the flanged hub.

It is also advantageous to have the vertical or upright flanges of the Y-shaped webs extend at the front face of the wheel. The flanged hub of the wheel preferably has an annular disk on the front face which is provided with an annular body for receiving the wheel mounting means on its inner side.

It is also advantageous to have the vertical flanges of the Y-shaped webs terminate at the annular disk of the flanged hub, while the bifurcated sections of the Y-shaped webs are joined to the outer circumference of the flanged hub annular body. The bores in the flanged hub which serve to receive the wheel mounting means and part of the webs preferably extend in a common radial plane.

Furthermore, it is also advantageous to construct the webs which extend in planes disposed between the bores so that their bifurcated sections diverge in the zone of the annular disk and in a V-fashion toward each of the adjoining bores.

Accordingly, it is an object of the present invention to create a wheel which not only satisfactorily withstands all the stresses occurring during the driving of the vehicle, but also a wheel which is extremely light-weight due to the optimally large apertures in the wheel center disk.

Another object of the present invention is to make the mounting zone of the wheel likewise very rugged and strong due to the functionally correct construction of the flanged hub.

BRIEF DESCRIPTION OF THE DRAWINGS

These and further objects, features and advantages of the present invention will become more apparent from the following description when taken in connection with the accompanying drawings which show, for purposes of illustration only, an embodiment in accordance with the present invention, and wherein.

DETAILED DESCRIPTION OF THE DRAWINGS

Figure 1:
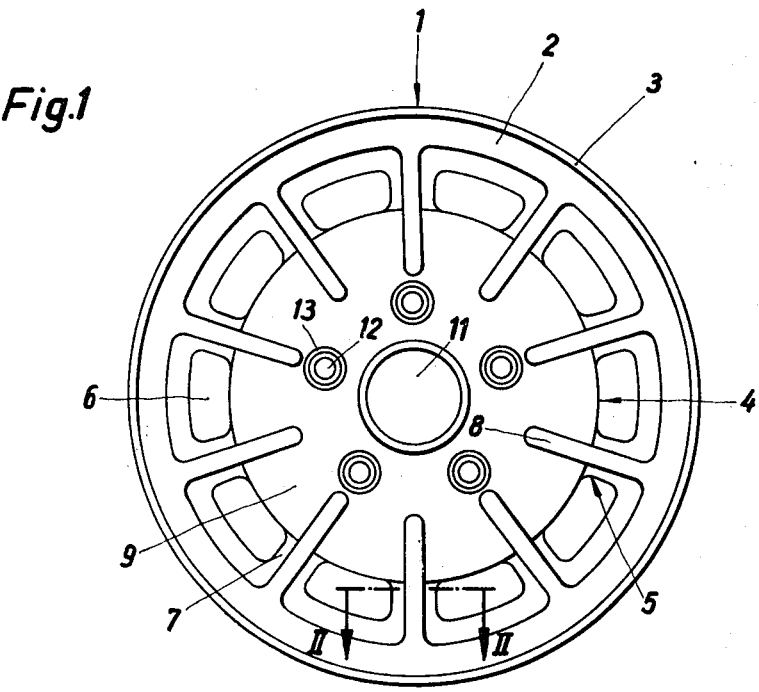
FIG. 1 is a front elevation view of a wheel in accordance with the present invention.
Figure 2:
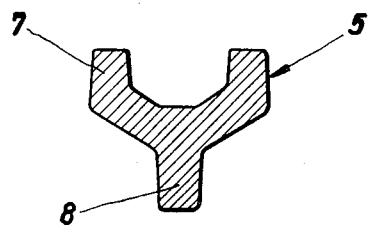
FIG. 2 is a sectional view along line II—II of FIG. 1, on an enlarged scale.
Figure 3:
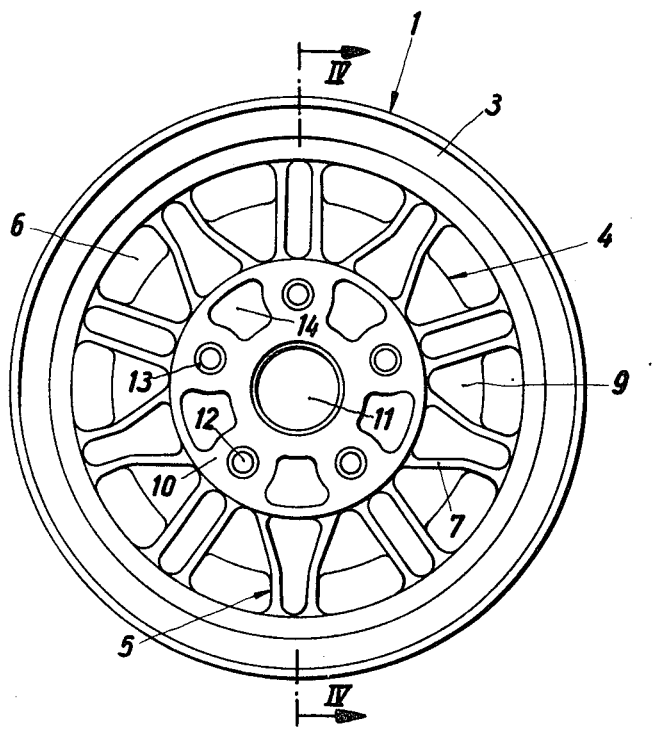
FIG. 3 is a rear elevation view of the wheel.
Figure 4:
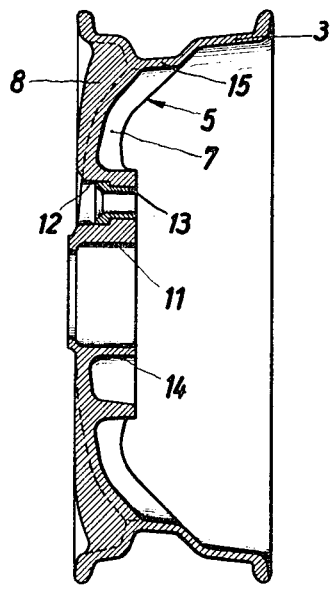
FIG. 4 is a sectional view along line IV—IV of FIG. 3.

With reference now to the drawings and, in particular, to FIG. 1 the wheel 1 is shown from the side 2 which is visible when the wheel is mounted. The wheel 1, which can be cast from a suitable light alloy or the like, comprises essentially a rim 3 and a flanged hub 4 which are connected with each other by radially arranged webs 5. The wheel 1 is furthermore provided with apertures 6 which are defined by the rim 3, the flanged hub 4 and the webs 5. The apertures 6 of the wheel 1 serve to reduce the weight of the wheel as well as for the ventilation of the brakes. The webs 5 have a Y-shaped cross-section as shown in FIG. 2 comprising a bifurcated section 7 and a vertical or upright flange 8.

The flanged hub 4 comprises an annular disk 9 and an annular body 10, and the vertical or upright flanges 8 of the Y-shaped webs 5 terminate on the front face of the annular disk 9. In the zone of the annular body 10 of the flanged hub 4, an opening or bore 11 for receiving an axle journal and bores 12 for mounting the wheel 1 are provided. The bores 12 are provided with bushings 13 and are disposed in a common radial plane with a number of the webs 5. Between the bores 12, cutouts or openings 14 are provided to also reduce the weight of the wheel 1.

The bifurcated sections of the Y-shaped webs 5 are connected to the outer circumference of the annular body 10 of the flanged hub 4. The webs 5 which extend radially between the bores 12 are constructed so that the bifurcated sections diverge in the zone of the annular disk 9 of the flanged hub 4 and in a V-manner toward each of the adjacent bores 12. The rim 3 is U-shaped and has a channel member or bed 15 in the zone facing toward the central plane of the wheel. From this channel member 15, the webs 5 extend into the flanged hub 4.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the present invention.

We claim:

1. A unitary, one piece wheel for automotive vehicles formed of an integral casting of a light weight and high strength metal, said wheel comprising a hub having a first annular thickened portion for receiving wheel mounting means and a second annular disc portion radially extending therefrom at the front face of the wheel as normally seen from the outside of the vehicle, a rim spaced from said hub, and a plurality of radially extending webs connecting said hub and said rim, each of said webs being substantially Y-shaped in cross section with a center leg portion bifurcating into substantially V-shaped leg portions, said center leg portion extending toward the front face of the wheel and the V-shaped leg portions extending toward the rear face of the wheel, said webs defining apertures intermediate said hub and said rim.

2. A unitary, one piece wheel as defined in claim 1, wherein said annular thickened portion includes bores for receiving wheel mounting means, said bores and some of said webs being disposed in substantially common radial planes.

3. A unitary, one piece wheel as defined in claim 2, wherein each of said bores is respectively arranged in the corresponding radial plane of alternate webs, the other webs arranged in radial planes between said radial planes of said alternate webs having said V-shaped leg portions diverging toward respective adjacent bores.

4. A unitary, one piece wheel as defined in claim 1, wherein said center leg portion of said webs terminate in the region of said annular thickened portion of said hub.

5. A unitary, one piece wheel as defined in claim 1, wherein at least eight of said webs are uniformly distributed about said wheel and said V-shaped leg portions terminate in the region of said annular thickened portion of said hub.

* * * * *